(12) United States Patent
Kraemer et al.

(10) Patent No.: US 7,484,264 B2
(45) Date of Patent: *Feb. 3, 2009

(54) AUTOMOBILE WINDSHIELD WIPER BLADE

(75) Inventors: Godelieve Kraemer, Huegelsheim (DE); Juergen Mayer, Gaggenau (DE)

(73) Assignee: Robert Bosch LLC, Broadview, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/760,394

(22) Filed: Jun. 8, 2007

(65) Prior Publication Data

US 2007/0226941 A1 Oct. 4, 2007

Related U.S. Application Data

(62) Division of application No. 10/312,279, filed as application No. PCT/DE02/01336 on Apr. 11, 2002, now Pat. No. 7,228,588.

(30) Foreign Application Priority Data

Apr. 26, 2001 (DE) ................................. 101 20 467

(51) Int. Cl.
*B60S 1/38* (2006.01)
(52) U.S. Cl. ................................ 15/250.201; 15/250.43; 15/250.48
(58) Field of Classification Search .............. 15/250.43, 15/250.44, 250.201, 250.451, 250.452, 250.48, 15/250.361
See application file for complete search history.

(56) References Cited

U.S. PATENT DOCUMENTS 2,687,544 A 8/1954 Scinta (Continued)

FOREIGN PATENT DOCUMENTS

DE 1028896 4/1958

(Continued)

OTHER PUBLICATIONS

International Search Report dated Aug. 19, 2002, European Patent Office, International Application No. PCT/DE02/01336 published Jul. 11, 2002.

*Primary Examiner*—Gary K Graham
(74) *Attorney, Agent, or Firm*—Michael Best & Friedrich LLP

(57) ABSTRACT

A wiper blade that cleans panes, in particular of motor vehicles. The wiper blade (10) comprises a strip-shaped, elongated, elastically resilient support element (12), the lower strip surface of which faces the pane (14) and is provided with an elongated, elastic wiper strip (24) running parallel to the longitudinal axis. The upper strip surface (16) of the element is provided with a wind deflector strip (42), which consists of an elastic material, extends in the longitudinal direction of the support element and has an oncoming stream surface (54) that faces the principal flow direction, (arrow 52), of the air stream. A particularly advantageous wiper blade, which is cost-effective to produce, can be achieved if the wind deflector strip, (when viewed in cross-section), comprises two limbs (48, 50), diverging from a common base (46) but mutually attached thereto, the free ends of said limbs facing the pane (14) and being supported on the wiper blade, and if in addition, the oncoming stream surface (54) is configured on the external face of one limb (50) and the cross-sectional profile of the wind deflector strip is the same over its entire length.

6 Claims, 2 Drawing Sheets

U.S. PATENT DOCUMENTS

| | | | |
|---|---|---|---|
| 2,814,820 | A | 12/1957 | Elliott et al. |
| 2,983,945 | A | 5/1961 | De Pew |
| 3,084,372 | A | 4/1963 | Krohm |
| 3,088,155 | A | 5/1963 | Smithers |
| 3,107,384 | A | 10/1963 | Wise |
| 3,116,507 | A | 1/1964 | Scinta |
| 3,116,509 | A | 1/1964 | Contant et al. |
| 3,121,133 | A | 2/1964 | Mathues |
| 3,317,945 | A | 5/1967 | Ludwig |
| 3,418,679 | A | 12/1968 | Barth et al. |
| 3,427,637 | A | 2/1969 | Quinlan et al. |
| 3,626,544 | A | 12/1971 | Lopez et al. |
| 3,636,583 | A | 1/1972 | Rosen |
| 3,785,002 | A | 1/1974 | Quinlan et al. |
| 3,879,793 | A | 4/1975 | Schlegel et al. |
| 3,881,214 | A | 5/1975 | Palu |
| 3,958,295 | A | 5/1976 | Green et al. |
| 4,360,943 | A | 11/1982 | Thompson et al. |
| 4,683,606 | A | 8/1987 | Sharp |
| 5,052,072 | A | 10/1991 | Chen |
| 5,493,750 | A | 2/1996 | Bollen et al. |
| 5,546,627 | A | 8/1996 | Chen |
| 5,933,910 | A | 8/1999 | Buechele et al. |
| 6,192,546 | B1 | 2/2001 | Kotlarski |
| 6,292,974 | B1 | 9/2001 | Merkel et al. |
| 6,588,048 | B2 * | 7/2003 | Ohyama ................. 15/250.43 |
| 6,675,434 | B1 | 1/2004 | Wilhelm et al. |
| 6,944,905 | B2 | 9/2005 | De Block et al. |
| 6,978,512 | B2 | 12/2005 | Dietrich et al. |
| 7,228,588 | B2 * | 6/2007 | Kraemer et al. ........ 15/250.201 |
| 2003/0014828 | A1 | 1/2003 | Edner-Walter et al. |

FOREIGN PATENT DOCUMENTS

| | | |
|---|---|---|
| DE | 1077540 | 3/1960 |
| DE | 1247161 | 8/1967 |
| DE | 1505357 | 5/1969 |
| DE | 2336271 | 7/1973 |
| DE | 2344876 | 9/1973 |
| DE | 2440179 | 8/1974 |
| DE | 2311293 | 9/1974 |
| DE | 2839587 A1 | 3/1980 |
| DE | 29611722 | 7/1996 |
| DE | 19627114 | 1/1998 |
| DE | 19627115 | 1/1998 |
| DE | 19650159 | 6/1998 |
| DE | 19734843 | 2/1999 |
| DE | 19736368 | 2/1999 |
| DE | 19802451 | 7/1999 |
| DE | 19856300 A1 | 6/2000 |
| DE | 10000373 A1 | 8/2001 |
| EP | 0316114 | 5/1989 |
| EP | 0624133 | 2/1993 |
| EP | 0646507 | 4/1995 |
| EP | 0930990 | 7/1999 |
| FR | 2199302 | 5/1974 |
| FR | 2679185 | 1/1993 |
| GB | 1222648 | 2/1971 |
| GB | 1269993 | 4/1972 |
| GB | 1429820 | 3/1976 |
| GB | 2036547 | 7/1980 |
| GB | 2106775 | 4/1983 |
| GB | 2336293 | 10/1999 |
| GB | 2346318 A | 9/2000 |
| JP | 6219467 | 2/1987 |
| JP | 6222172 | 2/1987 |
| JP | 2001502638 T | 2/2001 |
| WO | 9850261 | 11/1998 |
| WO | 9902383 | 1/1999 |
| WO | 0034090 | 6/2000 |
| WO | 0149537 | 7/2001 |
| WO | 0192073 A1 | 12/2001 |

* cited by examiner

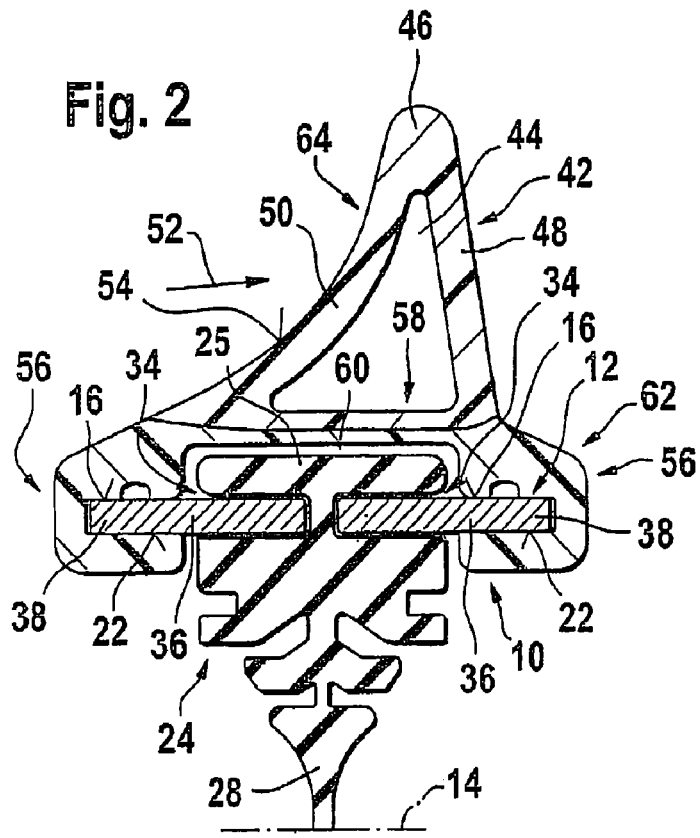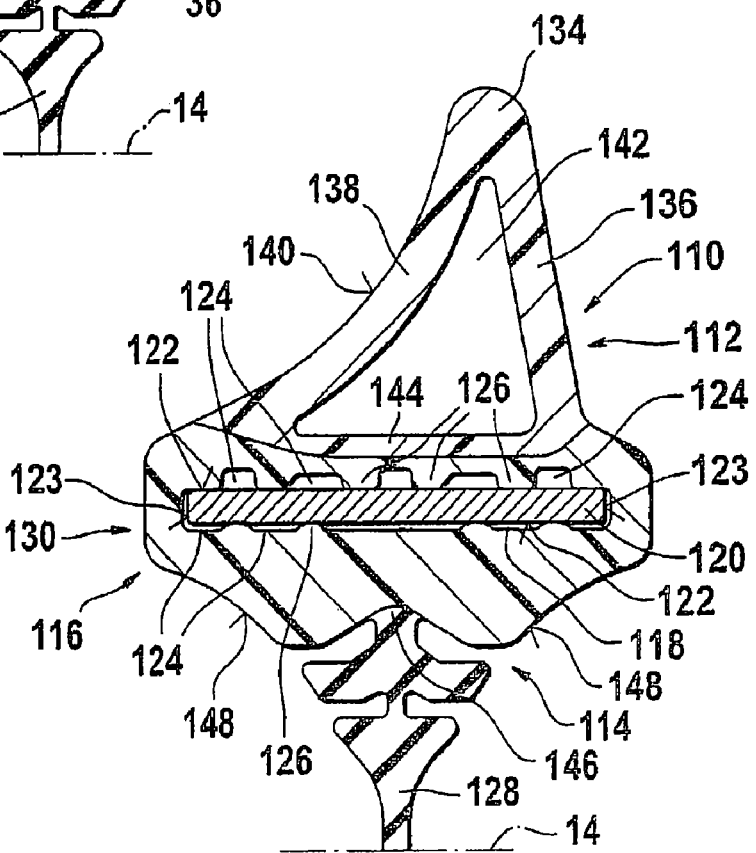

AUTOMOBILE WINDSHIELD WIPER BLADE

RELATED APPLICATION

This application is a divisional of U.S. application Ser. No. 10/312,279, filed Jul. 29, 2003, now U.S. Pat. No. 7,228,588 the entire content of which is incorporated herein by reference.

BACKGROUND

In wiper blades with a spring-action support element, the support element is intended to guarantee as even a distribution of wiper blade pressure onto the windshield issued from the wiper arm as possible, and over the entire wipe field swept by the wiper blade. By appropriately bending the un-loaded support element into shape—the unloaded state being when only the two ends of the wiper blade sit against the windshield—the ends of the wiper strip, which sits completely against the windshield when the wiper blade is in operation, are pushed toward the windshield by the loaded support element, even if the radii of curvature of spherically curved vehicle windshields change with the wiper blade position. The curvature of the wiper blade must therefore be somewhat greater than the maximum curvature measured within the wipe field on the windshield to be wiped. This is because during wiping, the wiper strip, or its wiping lip that sits against the windshield, must be continuously pressed against the windshield with a specific force. The support element thus replaces the expensive stirrup design with two flexible rails located in the wiper strip, as is practiced in conventional wiper blades (DE-OS 15 05 257) since the support element provides the necessary cross-stiffening of the elastic rubber wiper strip in addition to providing a distribution of pressure. Specifically, in the known wiper blade the contact force directed toward the windshield that is exerted by a wiper arm onto a main stirrup is conveyed to two claw-like stirrups and distributed from these onto the elastic rubber wiper strip via four claws. The two flexible rails of this wiper blade mainly provide a cross-stiffening of the wiper strip between the claws when the wiper blade is pushed across the windshield perpendicular to its longitudinal length.

SUMMARY OF THE INVENTION

In a prior art wiper blade of this type (DE 197 36 368.7), the wiper blade is provided with a so-called wind deflection strip in order to produce a force component directed toward the windshield to counteract the tendency of the wiper blade to lift off of the windshield due to the airflow at high vehicle speeds. To this end, the wind deflection strip has a leading edge during the pendulum wiping motion that is mainly impacted by the driving wind, said leading edge being designed as an incident surface. The cross section of the wind deflection strip has approximately the shape of a right triangle, one leg of which directly opposite the support element and the hypotenuse of which represents the incident surface. This makes a sharp angle with the pendulum-like plane of motion of the wiper blade and with the surface of the windshield. The triangle profile used requires a relatively large amount of material to manufacture the wind deflection strip, which is reflected in the costs of the wiper blade. Moreover, the weight of the wiper blade becomes undesirably high. Specifically, the increased mass to be accelerated in the pendulum wiping motion requires a more powerful drive system as well as a more expensive design of pendulum gear attached to it. Furthermore, the action of the support element and of the wiper blade can be adversely affected by the bending stiffness, which depends on its profile, of a wind deflection strip thus formed.

In the wiper blade according to the invention, the weight of the wind deflection strip is considerably reduced due to the cross sectional structure of an angular profile. Moreover, in addition to the material savings, there is a reduction in the moving mass along with the advantages with respect to the design of the drive system and the pendulum gear as a result. Also, the bending stiffness of the wind deflection strip is reduced, thus considerably reducing its influence on the bending and spring behavior of the wiper blade support element. For more detailed shapes, this wind deflection strip can be manufactured both as an injection molded part as well as using the simple, and thus cost effective, extrusion process.

In a further development of the invention, at least one support means is placed between the two sides of the wind deflection strip at a distance from their common base point, said support means stabilizing the sides. This provides a certain degree of stiffening even when using a relatively soft material for the manufacture of the wind deflection strip, which provides the necessary form stability of the wind deflection strip even at a high wind loads.

What is helpful here is that the support means is made up of a wall that extends in the longitudinal direction of the wind deflection strip that is connected to both sides, said wall extending along the entire length of the wind deflection strip, if necessary.

If the support element is made up of two flexible rails, each of which sits in a longitudinal notch associated with it, respectively, said longitudinal notches being open toward the opposite lateral sides of the wiper strip, and if the outer strip edges of each of said flexible rails extend out of these notches, the support means are positioned at a distance from the support element. This results in a space between the wiper strip and the support means into which the area of the wiper strip located above the support element can extend. By correspondingly dimensioning this space, undesired friction between the wiper strip and the wind deflection strip is prevented.

In another embodiment of the concept of the invention, the free ends of the sides of the wind deflection strip are provided, respectively, with claw-like extensions that grip tightly around these exterior strip edges of the support element at least in sections. This provides the ability to snap the wind deflection strip onto the exterior edge or to push it onto this edge in the longitudinal direction. This makes it possible to do away with a glued connection between the wind deflection strip and the support element. A glued connection of this type can limit the flexibility of the support element needed to attain a satisfactory wipe result due to its stiffness.

In the process, it can be advantageous if the wind deflection strip is designed as a binary component whose longitudinal area provided with the claw-like extensions is made of a harder material than the longitudinal area lying closer to the base. In this way, the longitudinal area of the wind deflection strip provided with the extensions can be manufactured from a material that is well suited for the purposes of securing the wind deflection strip to the support element, whereas the area of the wind deflection strip provided with the incident surface can be made of a material that accounts for the further requirements on the wind deflection strip.

In a wiper blade designed in this way, it can be advantageous if the transition from the harder longitudinal area to the softer longitudinal area occurs near the wall.

According to another embodiment of the invention, it can be advantageous in certain applications if the wind deflection strip and the wiper strip form a one-piece component that is penetrated by a longitudinal channel in which the support element sits that is designed as a one-piece flexible belt. It is further advantageous for the channel wall facing the upper belt surface of the support element to constitute the support means located between the two sides of the wind deflection strip. Designing the wiper blade according to the invention in this way is especially cost-effective to install since the wind deflection strip is made in one piece together with the wiper strip and thus some installation steps can be eliminated.

If the wall surfaces of the longitudinal channel facing the two belt surfaces of the support element are provided with longitudinal ribs that sit against the belt surfaces, this makes it considerably easier to insert the support element into the longitudinal channel as a result of the reduced friction surfaces.

In a wiper blade with a one-piece component encompassing the wind deflection strip and the wiper strip, the component has three longitudinal strip areas that are permanently connected to one another as seen in cross section, of which the wiper strip can be pressed against the windshield. The wiper strip is located on the side of the base strip, which contains the longitudinal channel, that is opposite the wind deflection strip. The three strip areas thus resulting must be designed to meet the requirements placed on them individually.

Thus, it can be very helpful if at least one of the strip areas of the component is made of a material whose hardness differs from the hardness of the other strip areas. In this way, it is possible to optimize the materials to be used with respect to the associated tasks of the individual strip areas.

Based on the requirements placed on the base strip, it is practical to make it out of a harder material than the wind deflection strip. It can also be advantageous if the transition from harder material to softer material occurs near the wall of the longitudinal channel that faces the upper belt surface of the support element.

In order to attain a satisfactory wipe result, it is practical to make the wiper strip out of a softer material than the base strip.

In the process, manufacturing advantages result if the transition from softer material to harder material occurs near the root of the wiper strip.

In order to avoid material such as snow, ice, etc. that is pushed away during the wiping process from getting jammed between the base strip and the windshield, the base strip becomes narrower as seen in cross section as it approaches the wiper strip.

To fasten a connector to the wiper blade, by means of which it can be attached to a driven wiper arm, a recess is provided in the center section of the wind deflection strip to which to attach this equipment. This recess can be produced by subsequently removing a central section of the wind deflection strip. However, in a wiper blade with a separate wind deflection strip, it is also conceivable to design this in two parts as seen in the longitudinal direction, so that one half of the wind deflection strip can be attached to the support element on both sides of the connector.

Other advantages of the further developments and configurations of the invention are given in the following description of exemplary embodiments illustrated in the associated drawing.

DESCRIPTION OF THE PREFERRED EMBODIMENTS

Figure 1:
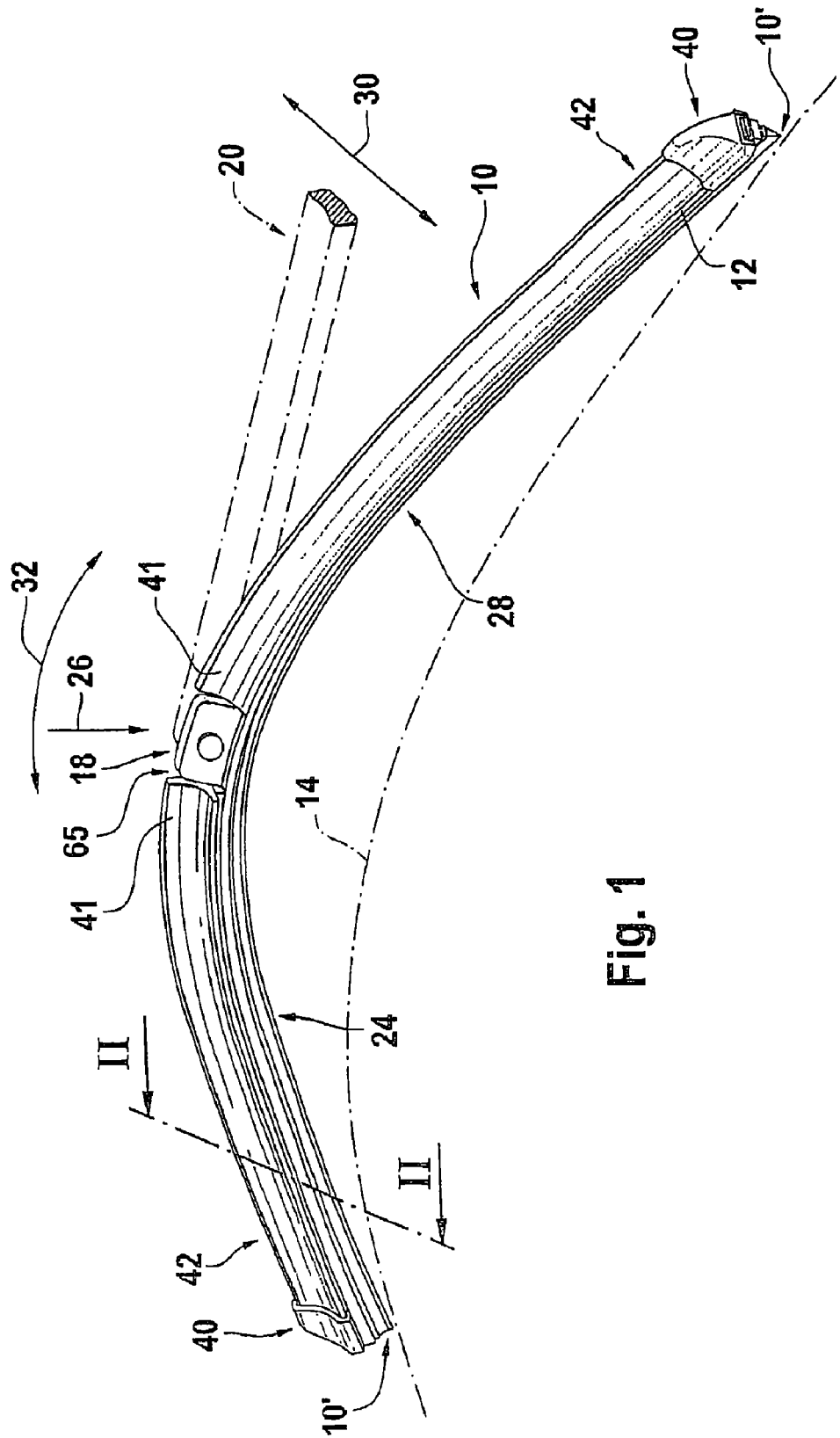
FIG. 1 a wiper blade according to the invention in a perspective representation with the wiper arm shown as a dot-dashed outline, FIG. 2 a cross section through the wiper blade along the line II-II in FIG. 1 in an enlarged representation and FIG. 3 the arrangement according to FIG. 2 for another embodiment of the wiper blade according to the invention.

A wiper blade 10 shown in FIG. 1 has an elongated belt-shaped, flexible spring, one or more part support element 12 that is curved in the longitudinal direction in the un-loaded state. Located on the convex upper, or exterior, side of the belt 16 (FIGS. 1 and 2) of the support element facing away from the windshield 14 to be wiped there is a connector 18 attached to the center section of the support element, for example flat. By means of this connector, the wiper blade 10 can be removably connected to a driven wiper arm 20 that leads to the body of an automobile. Located on the concave lower, or inner, side of the belt 22 of the curved support element 12 that directly faces the windshield is an elongated elastic rubber wiper strip 24 that extends parallel to the longitudinal axis of the support element 12. At the free end of the wiper arm are mating connectors, which are not illustrated in more detail, that cooperate with the connector 18 of the wiper blade to form a hinge. The wiper arm 20, and thus the wiper blade 10, is forced in the direction of the arrow 26 toward the windshield to be wiped whose surface to be wiped is indicated in FIG. 1 by the dot-dashed line 14. Since the dot-dashed line indicates the greatest amount of curvature of the windshield surface, it can be clearly seen that the curvature of the as yet unloaded wiper blade 10, whose ends 10 sit against the windshield 14, is greater than the maximum windshield curvature. The wiper blade thus has—in the unloaded state—a concave shape in comparison to the windshield. Under pressure (arrow 26) the wiping lip 28 of the wiper blade 10 that performs the wiping presses its entire length against the windshield surface 14 and assumes its working position approximating the stretched position. In the process, tension builds up in the belt-shaped flexible spring support element 12, ensuring proper seating of the wiper strip 24 and its wiping lip 28 along its entire length against the automobile windshield 14. Since the generally spherically curved windshield is not in fact a section of a spherical surface, the wiper blade 10 in conjunction with the wiper arm 20 must be able to constantly adjust itself according to its respective position and to the shape of the windshield surface 14 during its wiping motion (double arrow 30). This necessitates a hinged connection between the wiper arm 20 and the wiper blade 10, which enables a tilting motion (double arrow 32) about the hinge axis of the connection, if necessary.

Below, more detail is provided on the special configuration of the wiper blade 10 according to the invention with the help of a first embodiment of the wiper blade shown in FIG. 2.

The embodiment according to FIG. 2 of the wiper blade according to the invention has a wiper strip 24 whose two lateral sides opposite one another are each provided with a longitudinal notch 34, said notches being opposite one another, that is open toward the lateral side. Placed into each of the longitudinal notches 34 is a flexible rail 36 whose width is larger than the depth of the longitudinal notches 34. The two flexible rails 36 are part of the support element 12. Their outer longitudinal edges or strip edges 38 extend out from the longitudinal notches 34. The two flexible rails 36 are properly secured in their longitudinal notches 34 by end caps 40 (FIG. 1). Moreover, the connector 18 (FIG. 1) can also contribute to the securing of the flexible rails 36 in their longitudinal notches 34. At the side of the belt of the support element opposite the wiping lip 28, the wiper blade 10 is provided with a wind deflection strip 42 that is made of two pieces 41, between which the connector 18 for the wiper arm 20 sits on the support element 12 in a gap 65. The effective area of the wind deflection strip 42 extends from each end cap 40 to the connector 18 (FIG. 1). The wind deflection strip 42 is made of an elastic material, for example a plastic. It has an essentially triangular cross section with a cavity 44 that extends in the longitudinal direction of the wind deflection strip so that—as seen in the cross section—two side 48, 50 result that diverge from a common base point 46 and are connected to one another at the base point. Of these, side 50 is provided with a sloped incident surface 54 at its exterior that faces the main flow direction of the wind during driving (FIG. 2). The free ends of the two sides 48 and 50, which extend toward the windshield 14, are supported at the wiper blade, i.e. at the longitudinal edges 38 of the support element 12. To this end, they grip around the longitudinal edges 38 with tightly fitting claw-like extensions 56, at least in sections. Thus, on one side they sit against the upper side of the belt 16 of the support element 12 and grip under the lower side of the belt 22 via the extensions 56. To install the wind deflection strip 42, it is pushed onto the flexible rails 36 of the support element 12 in the longitudinal direction, said flexible rails having the wiper strip 24 installed on it, so that the longitudinal edges 38 are wrapped tightly by the claw-like extensions 56 of the wind deflection strip 42. So that the wind deflection strip 42, which is made of an elastic material, also has the necessary form stability at high rates of speed and thus at high wind pressures, a support means is placed between the two sides 48, 50 of the wind deflection strip 42 at a distance from their common base point 46, said support means stabilizing these sides. In the exemplary embodiment, this support means is made up of a wall 58 that is connected to the two sides 48, 50.

Furthermore, FIG. 2 shows that the wind deflection strip 42 has two longitudinal areas 62 and 64 that are made of different materials. The materials have different hardnesses. In the exemplary embodiment, the longitudinal area 64—which assumes the main tasks of the wind deflection strip by means of its incident surface 54—is made of a softer material than longitudinal area 62, which has in particular the claw-like extensions 56 that serves to secure the wind deflection strip 42 to the support element 12. In the process, the transition from harder longitudinal area 42 to the softer longitudinal area 64 occurs near the wall 58. In general, the wall 58 is placed at a distance from the claw-like extensions 56 and the support element 12 between it and the common base point 46 of the two sides 48, 50, so that an recess 60 results between the support element and the wall 58 that provides space for the strip flaps 25 of the wiper strip 24 located above the support element. This prevents the wiper strip 28 and the wind deflection strip 42, i.e. its wall 58 from touching one another, which disrupts the wiping process. The binary wind deflection strip 42 described has an even profile along its entire length. Thus it can be manufactured in an especially cost-effective manner by means of the so-called complex extrusion process.

The embodiment of the wiper blade 110 according to the invention corresponding to FIG. 3 differs from the wiper blade according to FIG. 2 especially in that the wind deflection strip 112 and the wiper strip 114 are permanently connected to a base strip 130. This results in a single strip-shaped component 116 whose base strip area is penetrated by a longitudinal channel 118 into which a support element 120 is placed that is designed as a one-piece flexible spring belt. This longitudinal channel wraps around both the two belt surfaces 122 as well as the two lateral edges 123 of the support element 120. The channel walls directly facing the belt surfaces are provided with a number of longitudinal recesses 124 so that longitudinal ribs 126 form between the recesses that sit against the belt surfaces 122. This facilitates the insertion of the support element 120 into the longitudinal channel 118. At the bottom of the base strip 130 facing the windshield 114 is the wiper strip 114 with its wiping lip 128, said wiper strip sitting against the windshield. The base strip becomes narrower—as seen in cross section—in the direction toward the wiper strip 114 so that walls result that slope toward the windshield 14, which is particularly advantageous when wiping iced windshields or windshields covered with wet snow. On the upper side of the base strip 130 that is opposite the wiper strip 114 is the wind deflection strip 112 with its incident surface 140. It also has a longitudinal cavity 142 that is placed such that between it and the longitudinal channel 118 a wall 144 remains that connects the sides 136, 138, which result from the cavity, that diverge from a common base point 134 toward the windshield 14. The wall stabilizes the two side 136, 138 of the wind deflection strip 112. Some of the longitudinal ribs 126 are located on the bottom. Further, each of the three strip areas 112, 128 and 130 of the component 116 is made of a different material. This makes it possible to select the appropriate material characteristics to account for the different requirements placed on the respective areas. For example, the hardness values of a strip area can differ from the hardness values of the others. It is especially advantageous if the base strip 130 is made of a harder material than the wind deflection strip 112 and/or the wiper strip 114. The transition from harder material to softer material then is intended to occur near the stabilizing wall 144 or in the root 146 of the wiper strip 114 where it transitions to the base strip 130. This results in transition regions between two directly adjacent strip areas 112 and 130 or 130 and 114. The exact position of these transition regions is established on a case-by-case basis by one trained in the art—taking into consideration the appropriate special requirements placed on the wiper blade.

In the embodiment of the wiper blade 110 according to FIG. 3, component 116 first of all has the same length as the support element 120. To secure component 116 to the support element in its longitudinal direction, it is provided at both ends with a recess so that the two end areas of the support element 120 are exposed and accessible to snap on end caps 40. Further, the wind deflection strip 112 is provided with a gap or recess at its center section that in principle corresponds to the gap 65 in FIG. 1. This recess can be designed deep enough that in this embodiment the support element 120 is exposed and thus ready for the installation of the connector 18. In this embodiment, it has been shown to be especially helpful if this gap 65 is attached by means of a process known as "water jet cutting".

Both the wind deflection strip 42 and the wiper strip 24 as well as the component 116 have an even profile along their entire length and can thus be manufactured in an especially cost-effective manner in one piece by means of the so-called extrusion process. In the process, it is quite helpful to manufacture these parts using the so-called complex extrusion process. The necessary sections can then be cut to length as needed—as well in the embodiment according to FIG. 2.

All exemplary embodiments share the characteristic that the wind deflection strip 42 or 112 has two sides 48, 50 or 136, 138 that diverge from a common base point 46 or 134 as seen in cross section and that are connected to it. The free ends of the sides that face the windshield 14 are supported at the wiper blade. What is also common is that the incident surface 54 or 140 is designed at the exterior of one side 50 or 138 and that the profile of the cross section of the wind deflection strip is the same along its entire length. Further, both exemplary embodiments have at least one support means located between the two sides 48, 50 of the wind deflection strip 42 or 112 at a distance from their common base point 46 or 134. This support means is made up of a wall 58 or 144 that is connected to both sides and extends in the longitudinal direction of the wind deflection strip, said wall extending along the entire length of the wind deflection strip, if necessary.

The invention claimed is:

1. A wiper blade (10) for an automobile windshield (14), with an elongated belt-shaped, flexible resilient support element (12) having a longitudinal axis, on the lower belt surface (22) of which that faces the windshield is located an elastic rubber wiper strip 24 sitting against the windshield that extends parallel to the longitudinal axis, and on the upper belt surface (16) of which a wind deflection strip (42 or 112) is located that has an incident surface (54 or 140) facing the main flow direction of a driving wind (arrow 52), said deflection strip extending in the longitudinal direction of the support element, characterized in that the wind deflection strip has two sides (48, 50 or 136, 138) that diverge from a common base point (46 or 134) as seen in a cross section, that the incident surface (54 or 140) is located at the exterior of one side (50 or 138) and that the profile of the cross section of the wind deflection strip is the same along its entire length, wherein the support element has outer edges, and wherein the sides of the wind deflection strip have respective free ends having thereon respective claw-like extensions that fittingly grip around the outer edges of the support element at least in sections, so that the wind deflection strip can be snapped onto the outer edges or slid onto the outer edges in a longitudinal direction, wherein between the two sides (48, 50 or 136, 138) of the wind deflection strip (42 or 112) there is at least one support means (58 or 144) located at a distance from their common base point (46 or 134) that stabilizes the sides, wherein the support means is made up of a wall (58 or 144) connected to both sides (48, 50 or 136, 138) that extends in the longitudinal direction of the wind deflection strip (42 or 112), and wherein the wall (58 or 144) extends along the entire length of the wind deflection strip (42 or 112).

2. A wiper blade according to claim 1, characterized in that the support element (12) includes two flexible rails (36) each of which sits in a longitudinal notch (34) associated with it, respectively, said longitudinal notches being open toward the opposite lateral sides of the wiper strip (24), that the outer strip edges (38) of each of said flexible rails extend out of these notches, and that the support means (58 or 144) are positioned at a distance from the support element (12).

3. A wiper blade according to claim 1, characterized in that the wind deflection strip (42) is designed as a binary component whose longitudinal area provided with the claw-like extensions (56) is made of a harder material than a longitudinal area lying closer to the base point (46).

4. A wiper blade according to claim 3, characterized in that a transition from the harder longitudinal area to the softer longitudinal area occurs near the wall (58).

5. A wiper blade according to claim 1, characterized in that the wind deflection strip (42 or 112) has a longitudinal center section, and in that a recess (65) is located in the center section of the wind defection strip (42 or 112) at which to place a device (18) to connect a drive wiper arm (20).

6. A wiper blade according to claim 1, characterized in that the wind deflection strip (42 or 112) is made of a flexible plastic.

* * * * *